United States Patent
Koay

(10) Patent No.: US 7,019,733 B2
(45) Date of Patent: Mar. 28, 2006

(54) OPTICAL MOUSE ADAPTED FOR USE ON GLASS SURFACES

(76) Inventor: Ban Kuan Koay, 19, Persiaran Kelicap 2, 11900 Penang (MY)

( * ) Notice: Subject to any disclaimer, the term of this patent is extended or adjusted under 35 U.S.C. 154(b) by 325 days.

(21) Appl. No.: 10/404,252

(22) Filed: Mar. 31, 2003

(65) Prior Publication Data

US 2004/0189593 A1 Sep. 30, 2004

(51) Int. Cl.
*G09G 5/08* (2006.01)
(52) U.S. Cl. .................. 345/163; 345/345; 345/166
(58) Field of Classification Search ........ 345/156–157, 345/163, 166
See application file for complete search history.

(56) References Cited

U.S. PATENT DOCUMENTS 6,741,234 B1 * 5/2004 Son ........................... 345/166
2002/0080117 A1 * 6/2002 Son et al. ................... 345/163
2002/0080121 A1 * 6/2002 Son ........................... 345/166

\* cited by examiner

*Primary Examiner*—Alexander Eisen
*Assistant Examiner*—Duc Q Dinh

(57) ABSTRACT

A pointing device having an illumination system, camera system, and positioning mechanism is disclosed. The illumination system illuminates a surface below a transparent plate having a constant thickness. The camera system records images of the illuminated surface. The positioning mechanism adjusts the relative position of the illumination with respect to the camera system. The relative position is determined by the constant thickness. The positioning mechanism has a first position corresponding to a predetermined value for the constant thickness and a second position corresponding to the constant thickness being zero. The positioning mechanism is operable by a user of the pointing device to compensate for different thicknesses of transparent plates.

9 Claims, 4 Drawing Sheets

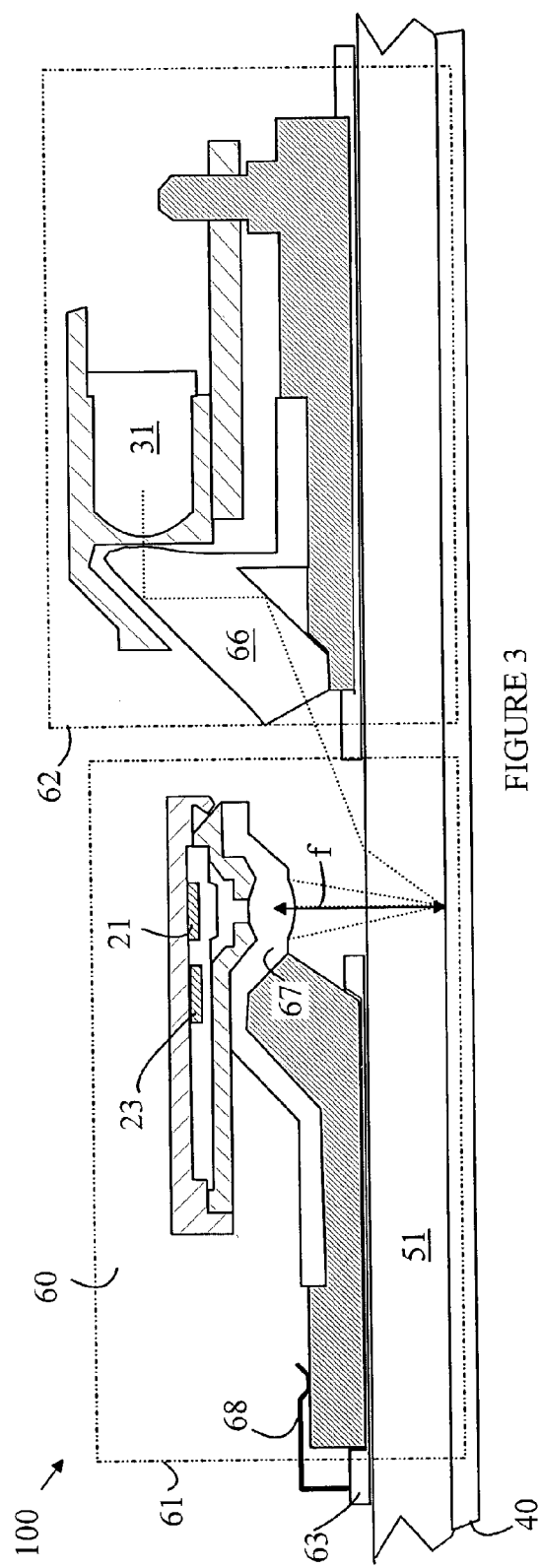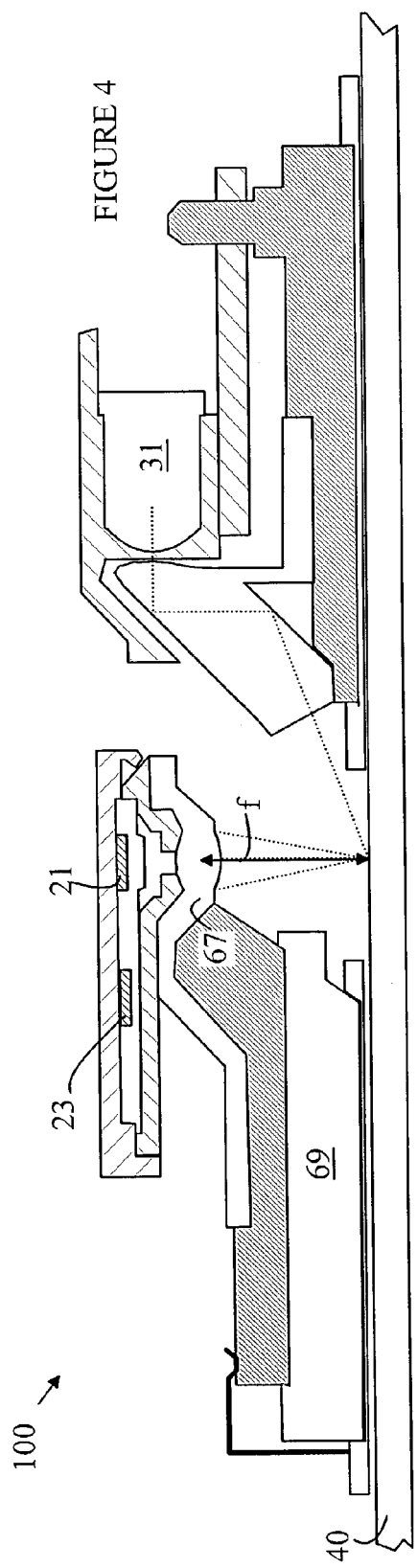

OPTICAL MOUSE ADAPTED FOR USE ON GLASS SURFACES

FIELD OF THE INVENTION

The present invention relates to computer pointing devices, and more particularly, to an improved optical mouse.

BACKGROUND OF THE INVENTION

A common form of pointing device for use with computers and the like is referred to as a "mouse". The computer user moves the device over a surface to move a cursor on the computer screen. The amount of motion and the direction of motion of the mouse are sensed by the device and determine the distance and direction in which the cursor moves on the screen. Inexpensive mice based on a ball that rolls over the surface have been used for some time. The ball turns two cylinders that sense the distance and direction of motion. Unfortunately, the ball picks up grease and other dirt from the surface and transfers this material to the cylinders. The resulting coating on the cylinders interferes with the motion of the cylinders, and hence, the devices must be cleaned periodically. The cleaning operation is awkward and time consuming.

Mice based on optical sensing avoid this problem. Originally, such mice had to be moved over a special pad that had grid lines that were sensed by the device. The need to use this special pad made these devices less attractive than the mechanical mice discussed above. Recently, optical mice that do not require such pads have been developed. These mice include a light source that illuminates the surface under the mouse at a shallow angle, which accentuates the structural details of the surface. An image sensor in the mouse records an image of the illuminated surface periodically. By comparing two successive images, the displacement of the mouse between the times at which the images were taken can be determined.

Unfortunately, this type of optical mouse does not function properly on a glass-covered surface such as the glass tops used on many desks or other work surfaces. The glass covers are used to protect the underlying surface. The top surface of the glass is too smooth to provide an image that has sufficient structure to measure the displacement of the mouse. While the surface under the mouse often has the required structure, the imaging sensor in the mouse is positioned relative to the light source in a manner that prevents this underlying surface from being utilized. Hence, optical mice have not been useable on many glass covered desktops.

SUMMARY OF THE INVENTION

The present invention includes a pointing device having an illumination system, camera system, and positioning mechanism. The illumination system illuminates a surface below a transparent plate having a constant thickness. The camera system records images of the illuminated surface. The positioning mechanism adjusts the relative position of the illuminated surface with respect to the camera system. The relative position is determined by the constant thickness. The positioning mechanism has a first position corresponding to a predetermined value for the constant thickness and a second position corresponding to the constant thickness being zero. The positioning mechanism is operable by a user of the pointing device to compensate for different thicknesses of transparent plates. The pointing device can also include a controller for comparing first and second images taken by the camera at different times and for determining a displacement indicative of the direction and distance the positioning device moved between the two different times. In one embodiment, the positioning mechanism includes a base member having a surface that moves over the transparent plate. One of the illumination system or the camera system is fixed to the base and the other of the illumination system or the camera system is connected to the positioning mechanism such that the position of that one of the illumination system or the camera system relative to the other one of the illumination system or the camera system is varied by the positioning mechanism. In another embodiment, the base member includes a surface for receiving a removable spacer having first and second surfaces. The first surface of the spacer mates with the surface of the base member, and the second surface of the spacer mates to the one of the illumination system or the camera system that is not fixed to the base member. The relative position of the illumination system and the camera system is determined by the spacer dimensions. In yet another embodiment of the present invention, the base member includes a cam surface that mates with a surface of the one of the of the illumination system or the camera system that is not fixed to the base member at a position that can be varied manually. The position on the cam determines the relative position of the illumination system and the camera system.

BRIEF DESCRIPTION OF THE DRAWING

FIG. 3 shows mouse 100 operating on a glass plate 51 that covers an opaque surface 40 that is imaged by the illumination section 60 of the mouse.

FIG. 4 illustrates the positioning of the illumination section when the mouse is operated on a surface 40 that is imaged without an intervening glass layer 51.

DETAILED DESCRIPTION OF THE PREFERRED EMBODIMENTS OF THE INVENTION

Figure 1:
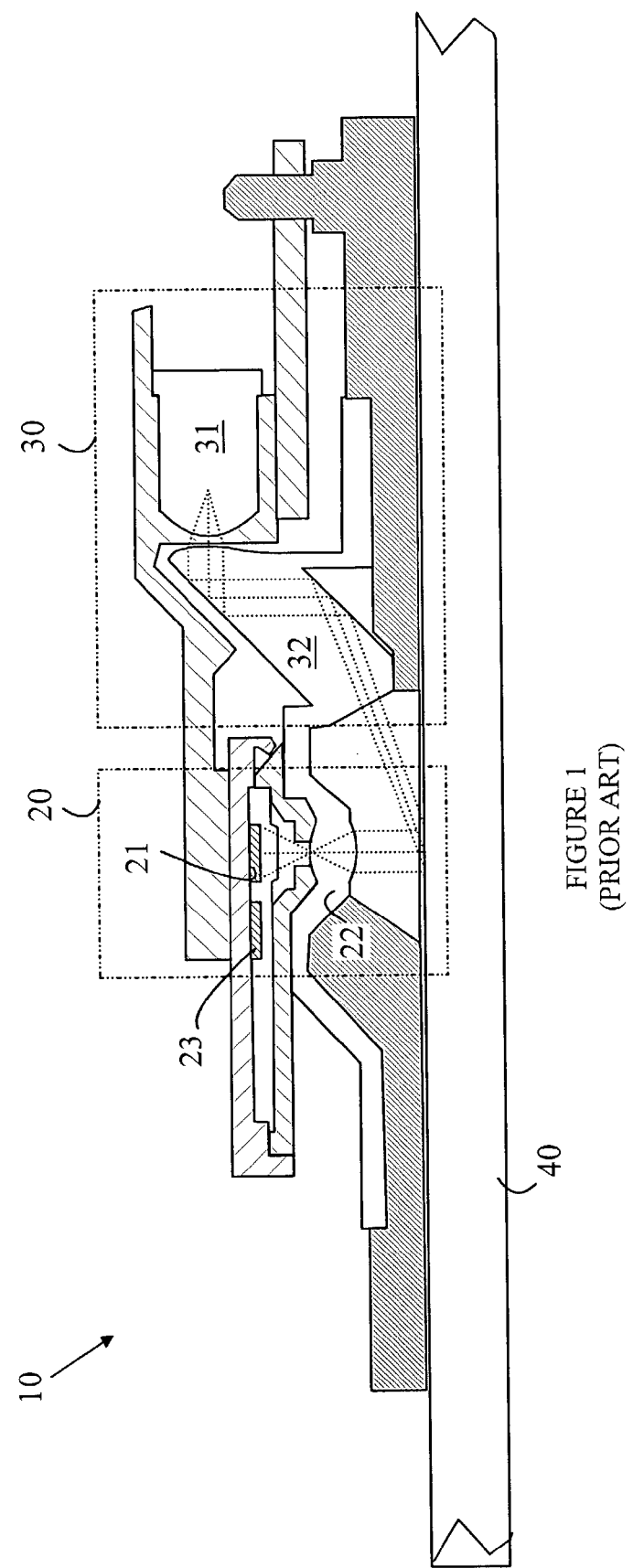
FIG. 1 is a simplified cross-sectional view of an optical mouse 10 that moves over an opaque substrate 40.
Figure 2:
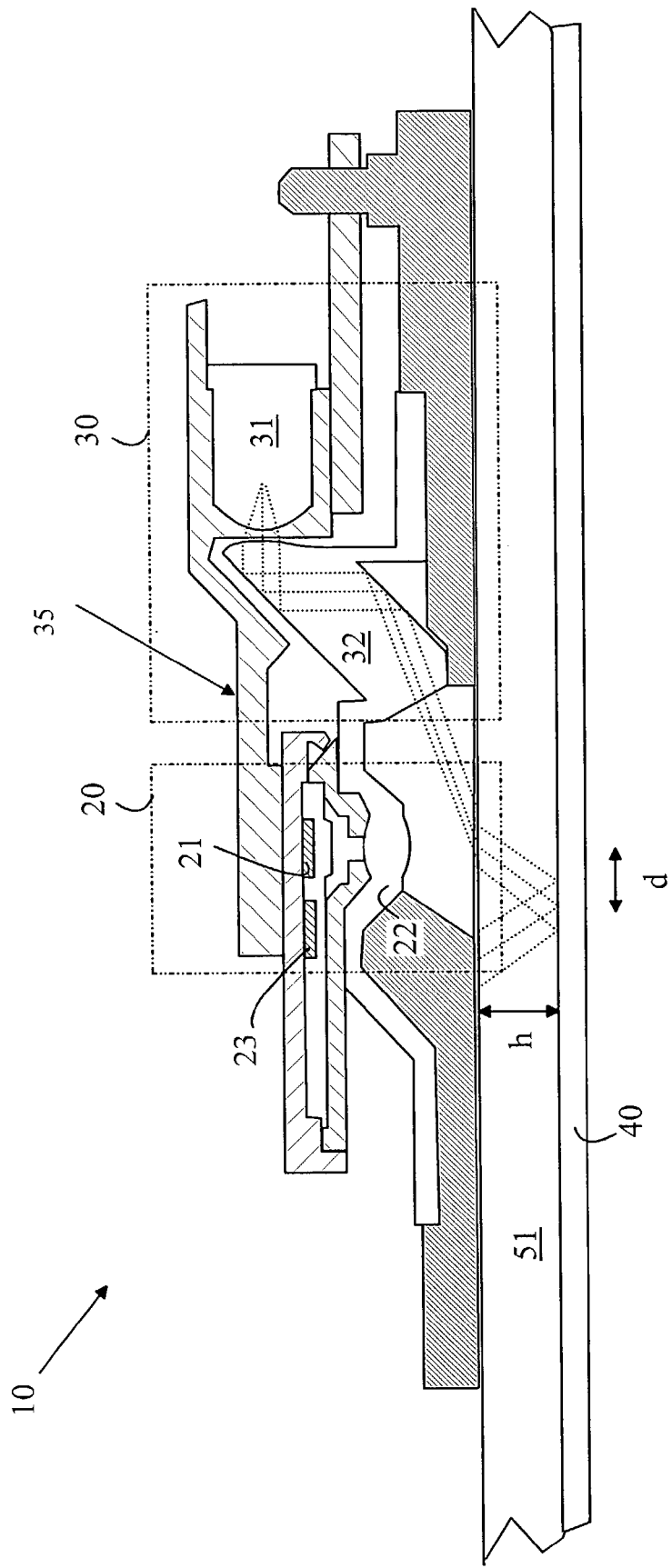
FIG. 2 is a cross-sectional view of mouse 10 with a glass plate 51 between mouse 10 and surface 40.

The manner in which the present invention provides its advantages can be more easily understood with reference to FIGS. 1 and 2. FIG. 1 is a simplified cross-sectional view of an optical mouse 10 that moves over an opaque substrate 40. Mouse 10 may be viewed as having two principal components, an illumination section 30 and an imaging section 20. Illumination section 30 typically includes an LED light source 31 and an optical assembly 32 that illuminates surface 40 with collimated light that strikes the surface at a shallow angle relative to the surface. Light from the illuminated portion of the surface is imaged by the imaging section onto a sensor 21 with the aid of a lens assembly 22. Sensor 21 is a two-dimensional array of imaging elements that forms an image of a portion of surface 40.

When the mouse is moved relative to the surface, the image shifts on sensor 21. If images are taken sufficiently close together in time, each successive image will contain a portion of the previous image. Hence, by comparing two successive images, mouse 10 can determine the offset between the images. For example, mouse 10 can compute the correlation of the first image shifted by various amounts with the second image. The shift that provides the highest correlation is assumed to be the displacement of the mouse during the period of time that elapsed between the times at which the two images were taken. In the embodiment shown in FIG. 1, it is assumed that a controller 23 performs the displacement computations and outputs a signal indicative of the motion. However, embodiments in which the image is output to a computer attached to the optical mouse can also be constructed.

Refer now to FIG. 2, which is a cross-sectional view of mouse 10 with a glass plate 51 between mouse 10 and surface 40. Such glass plates are often used as protective coverings on writing desks. The top surface of glass plate 51 is too smooth to provide a reflected image having sufficient structure to allow the above-described correlation algorithm to operate successfully. Hence, the light from LED 31 is refracted into the glass and illuminates surface 40 under the glass plate. This light is then reflected back toward the mouse. Unfortunately, the illuminated area is shifted laterally by an amount d and vertically by an amount h relative to the area illuminated in the absence of the glass plate. Hence, the imaging optics 21 fail to image the illuminated area on sensor 22 either because the area of interest is outside the field of view of the imaging optics or because the area of interest is no longer in focus. Accordingly, the mouse will not operate satisfactorily on such a surface.

The present invention is based on the observation that the imaging section needs to be moved both laterally and orthogonally with respect to the illumination section when the mouse is to be operated over a clear plate or the like. When the mouse is operated on a glass surface, the imaging optic needs to be lowered and moved away from the illumination section. Prior art mouse designs cannot accommodate such motion, since the imaging section is rigidly positioned with respect to the illumination section by a clip 35.

The present invention avoids this problem by providing a mouse in which the imaging sub-system can be moved relative to the illumination sub-system to compensate for the effects of a glass or other clear surface being placed over the tabletop that is imaged by the sensor. Refer now to FIGS. 3 and 4, which are cross-sectional views of one embodiment of a mouse 100 according to the present invention. FIG. 3 shows mouse 100 operating on a glass plate 51 that covers an opaque surface 40 that is imaged by the illumination section 60 of the mouse. The illumination section includes an imaging optic 67 designed to image a surface at a distance f from the optic onto the image sensor 21. Mouse 100 also includes an illumination sub-section 62 having a light source 31 and an illumination optic 66, which illuminates a predetermined area in front of the illumination optic.

FIG. 4 illustrates the positioning of the illumination section when the mouse is operated on a surface 40 that is imaged without an intervening glass layer 51. In this configuration, the imaging sensor and optic are raised and moved closer to the illumination sub-system.

In one embodiment of the present invention, the positioning of the illumination sub-system is accomplished through the use of separate base plates that determine the position of the two sub-systems relative to one another. In general, there are only a small number of glass thicknesses that need to be accommodated, since glass plates are commonly manufactured in only a small number of thicknesses. In addition, the imaging optic can accommodate a small range of thicknesses for each possible relative position of the two sub-systems. Mouse 100 includes a base plate 63 that provides the positioning for the thickest glass plate. The illumination system is attached to this base plate. The imaging system 61 fits into a detent in this base plate and is held in place by a clamp 68. The mouse is shipped with a number of adapters 69 that can be used to reposition the imaging sub-system for use with various thicknesses of glass plates. In addition, an adapter that properly positions the illumination system for use over an opaque surface with no intervening glass layer is also provided. The mouse is preferably shipped with this adapter installed so that the adapter only needs to be changed if the mouse is to be used on a glass surface. Each adapter preferably includes markings indicating what range of glass thicknesses are accommodated by that adapter. Hence, the user only needs to measure the thickness of the glass top and chose the correct adapter.

While the embodiment shown in FIGS. 3 and 4 utilize a specific mechanism for adjusting the position of the imaging system relative to the illumination sub-system, other mechanisms can be utilized. For example, the illumination system can also be removably attached to the base plate to provide further design flexibility.

Figure 5:
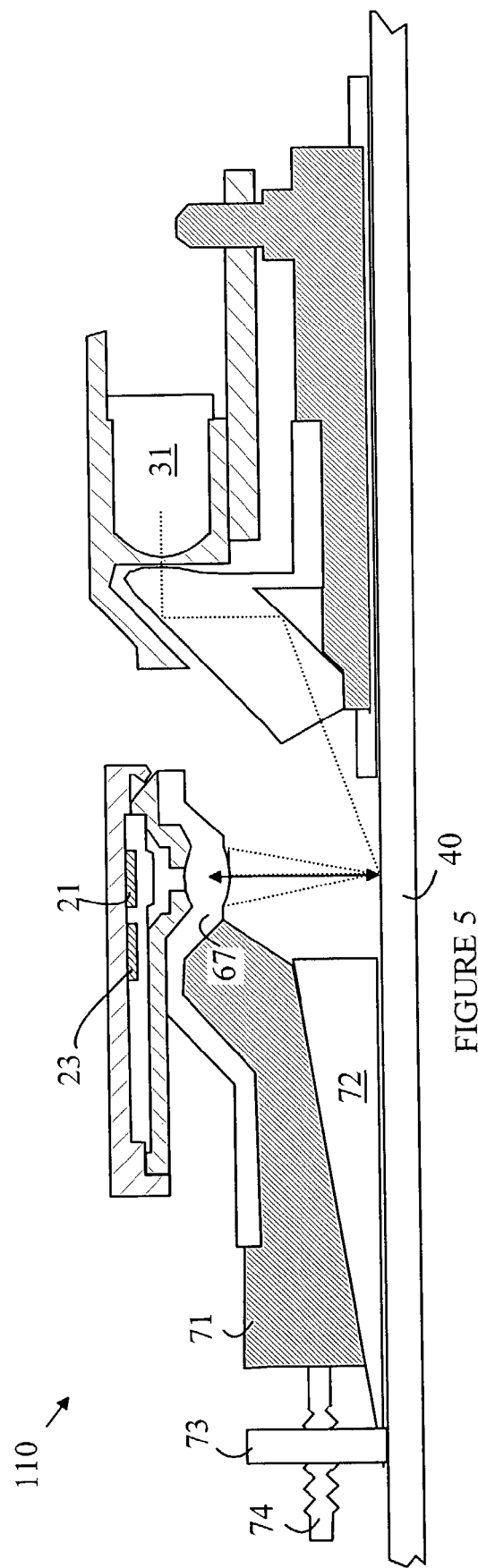
FIG. 5 is a cross-sectional view of a second embodiment of a mouse according to the present invention.

Refer now to FIG. 5, which is a cross-sectional view of a second embodiment of a mouse according to the present invention. Mouse 110 utilizes a ramp 72 to set the position of the imaging sub-system. In this embodiment, the position of the imaging sub-system on the ramp is controlled by adjusting a screw 74 that passes through a fixed member 73 and is connected to the imaging subsystem. As the imaging subsystem member 71 moves along ramp 72, the imaging optic and image sensor are moved both vertically and horizontally thereby providing the needed adjustment. The slope of the ramp is chosen to provide the required changes in vertical and horizontal position. While the embodiment shown in FIG. 5 utilizes a manual adjustment mechanism, embodiments that incorporate motor drives for positioning the illumination system can also be constructed. Such devices provide a mechanism for automating the adjustment of the illumination system.

Various modifications to the present invention will become apparent to those skilled in the art from the foregoing description and accompanying drawings. Accordingly, the present invention is to be limited solely by the scope of the following claims.

What is claimed is:

1. A pointing device comprising:
an illumination system for illuminating a surface below said illumination system;
a camera system for recording an image of said illuminated surface; and
a position mechanism for adjusting the relative position of said illumination system with respect to the camera system, said relative position determined by a thickness of a transparent plate located between the illumination system and said illuminated surface, said position mechanism has a first position corresponding to a predetermined value of said thickness, and a second position corresponding to an absence of said transparent plate, said position mechanism being operated by a user of said pointing device.

2. The pointing device of claim 1 further comprising a controller for comparing first and second images taken by said camera at different times and for determining a displacement indicative of the direction and distance said pointing device moved between said two different times.

3. The pointing device of claim 1 wherein said positioning mechanism comprises a base member having a surface that moves over said transparent plate, one of said illumination system or said camera system being fixed to said base and the other of said illumination system or said camera system being connected to said positioning mechanism such that the position of that one of said illumination system or said camera system relative to the other one of said illumination system or said camera system is varied by said positioning mechanism.

4. The pointing device of claim 3 wherein said base member comprises a surface for receiving a removable spacer having first and second surfaces, said first surface of said spacer mating with said surface of said base member and said second surface of said spacer mating to said one of said illumination system or said camera system that is not fixed to said base member, said relative position of said illumination system with respect to said camera system being determined by said spacer.

5. The pointing device of claim 3 wherein said base member comprises a cam surface that mates with a surface of said one of said illumination system or said camera system that is not fixed to said base member at a position that can be varied manually, said position determining said relative position of said illumination system with respect to said camera system.

6. In a pointing device comprising an illumination system for illuminating a surface; and a camera system for periodically recording an image of said illuminated surface, the improvement comprising: providing a manually operable positioning mechanism for adjusting the relative position of said illumination system with respect to said camera system to compensate for a thickness of a transparent plate located between said pointing device and said illuminated surface.

7. The pointing device of claim 6 wherein said positioning mechanism comprises a base member having a surface that moves over said transparent plate, one of said illumination system or said camera system being fixed to said base and the other of said illumination system or said camera system being connected to said positioning mechanism such that the position of that one of said illumination system or said camera system relative to the other one of said illumination system or said camera system is varied by said positioning mechanism.

8. The pointing device of claim 7 wherein said base member comprises a surface for receiving a removable spacer having first and second surfaces, said first surface of said spacer mating with said surface of said base member and said second surface of said spacer mating to said one of said illumination system or said camera system that is not fixed to said base member, said relative position of said illumination system with respect to said camera system being determined by said spacer.

9. The pointing device of claim 7 wherein said base member comprises a cam surface that mates with a surface of said one of said illumination system or said camera system that is not fixed to said base member at a position that can be varied manually, said position determining said relative position of said illumination system with respect to said camera system.

* * * * *